United States Patent [19]

Mitchell

[11] Patent Number: 4,728,521

[45] Date of Patent: Mar. 1, 1988

[54] FISH STORAGE TRAY AND DIVIDERS AND METHOD OF STORING FROZEN FISH

[76] Inventor: Patrick J. Mitchell, P.O. Box 88943, Seattle, Wash. 98188

[21] Appl. No.: 24,267

[22] Filed: Mar. 10, 1987

[51] Int. Cl.⁴ .................. B65D 5/48; A22C 25/00; A22C 25/12; A23B 4/06

[52] U.S. Cl. ........................... 426/119; 62/60; 229/120.22; 229/120.33; 229/120.02; 217/31; 217/33; 426/124; 426/129; 426/393; 426/524; 206/561

[58] Field of Search ............... 426/119, 120, 108, 124, 426/129, 393, 513, 524, 643; 206/561; 229/15, 42; 217/30, 31, 32, 33, 34, 22; 220/22.1; 62/60, 64

[56] References Cited

U.S. PATENT DOCUMENTS

| | | | |
|---|---|---|---|
| D. 19,143 | 6/1889 | Whitman . | |
| D. 24,502 | 7/1895 | Fatton . | |
| D. 26,119 | 9/1896 | Spilka . | |
| 1,140,178 | 5/1915 | McDougall | 426/393 |
| 1,140,741 | 5/1915 | Grunow | 229/15 |
| 1,190,348 | 7/1916 | Westberg | 229/15 |
| 1,621,257 | 3/1927 | Knowlton et al. | 62/60 |
| 1,688,887 | 10/1928 | Spreen . | |
| 1,977,373 | 10/1934 | Birdseye | 426/393 |
| 2,045,183 | 6/1936 | Fowle | 426/119 |
| 2,496,755 | 2/1950 | Schwartzberg | 426/119 |
| 2,569,733 | 10/1951 | Ringler | 206/422 |
| 3,079,028 | 2/1963 | Rosner | 426/119 |
| 3,127,090 | 3/1964 | Scott | 426/129 |
| 3,145,836 | 8/1964 | Tyrseck et al. | 206/422 |
| 3,152,915 | 10/1964 | Cover et al. | 426/119 |
| 3,363,753 | 1/1966 | Taylor . | |
| 3,934,723 | 1/1976 | Walker . | |
| 4,579,276 | 4/1986 | Manizza . | |

FOREIGN PATENT DOCUMENTS 672603 4/1929 France ................... 426/129

OTHER PUBLICATIONS

Food Technology 11/54, p. 490 plus.
Industrial & Engineering Chem., vol. 21, p. 573, 6/29.
Quick Frozen Foods, 1/51, p. 82 plus.

*Primary Examiner*—Steven Weinstein
*Attorney, Agent, or Firm*—Seed and Berry

[57] ABSTRACT

A fish storage tray is provided with several modular plastic dividers which conform to the shape of the fish and hold fish in a belly-up position in the tray for individual freezing and storing. The individual dividers are elongated plastic strips having connectors either integral or separable at opposite ends to enable the dividers to be expanded to conform to the size of a fish placed between dividers. The method of storing fish includes the step of separating a tray into a plurality of compartments using flexible conforming plastic strips interconnected to one another at alternating opposite ends to form an accordion-type divider pattern within the tray. Fish are then placed between the plastic dividers in an alternating head-to-tail arrangement and with the bellies up. The fish are then frozen and, if desired, glazed and placed in storage.

12 Claims, 5 Drawing Figures

U.S. Patent   Mar. 1, 1988   4,728,521
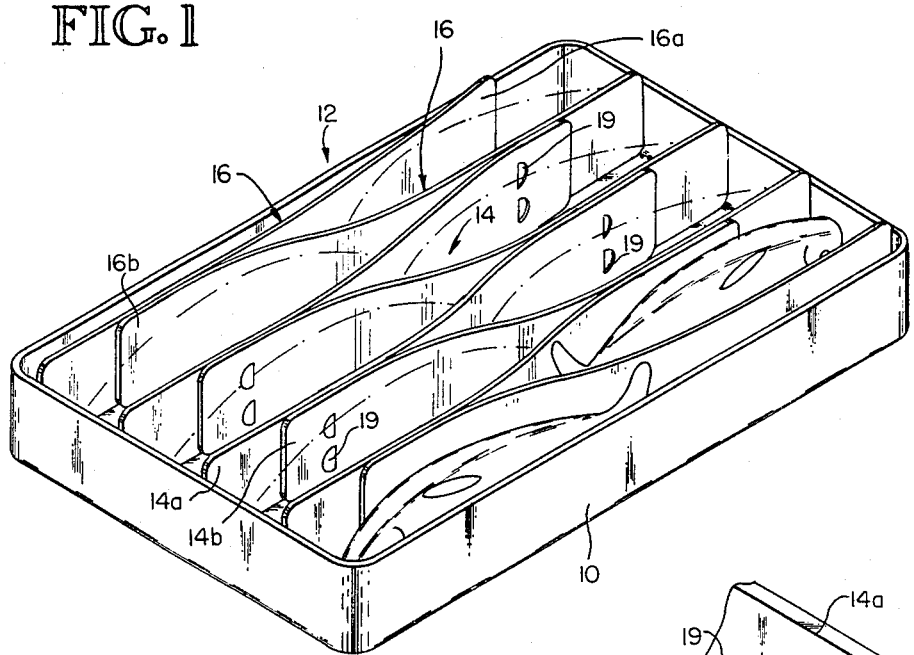
FIG. 1
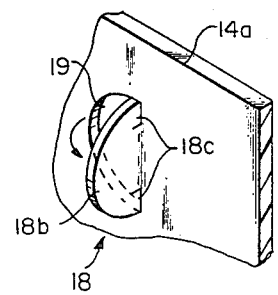
FIG. 4
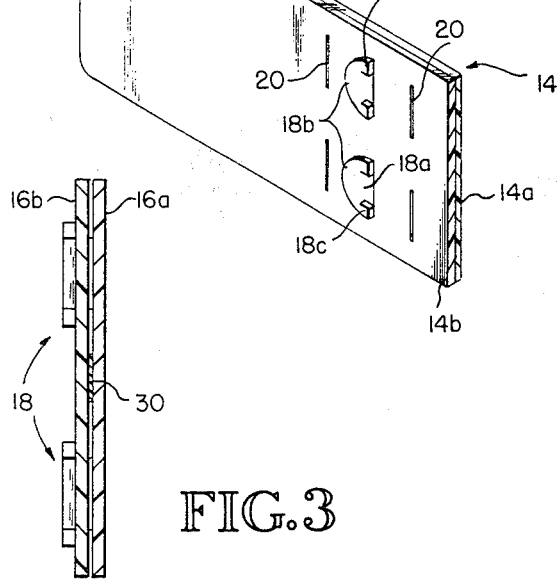
FIG. 2
FIG. 3
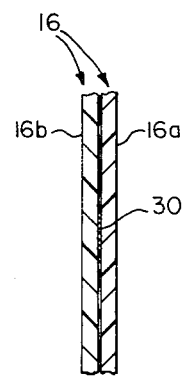
FIG. 5

FISH STORAGE TRAY AND DIVIDERS AND METHOD OF STORING FROZEN FISH

DESCRIPTION

Technical Field

This invention pertains to methods for freezing individual fish. The invention also pertains to fish storing trays and modular dividers for such trays. The invention pertains not only to the combination of the dividers within the tray, but the individual dividers, per se.

Background Art

It is well known that certain types of commercially harvested fish, such as salmon, obtain a premium price if delivered to the retail outlet or restaurant in an essentially unblemished and attractive condition. The normal technique of the commercial fisherman for freezing such fish is to freeze several of the fish into a solid block of ice. Fish frozen in this way have a less desirable appearance and do not command as high a price as individually frozen fish.

Thus, the more desirable technique for preserving the appearance of freshly caught fish is to individually freeze each fish separate from another. The technique for doing this is to lay the fish on their sides in a tray. The fish are then fast-frozen. Since the fish do not contact one another, they tend to retain a less blemished appearance. An undesirable feature of this type of freezing, however, is that prior to the fish actually obtaining a rigid frozen condition, the tail and head will sag, causing the fish to be frozen in a curved shape. The fish tend to retain this curved shape even after thawing, detracting from the overall appearance of the fish as they lie in a retail outlet showcase. An additional difficulty with the technique of individually freezing fish while on their sides is that the fish take up a large amount of space in the tray and only a few fish can be placed in each tray.

Disclosure of the Invention

It is an object of this invention to provide an improved method for individually freezing and storing fish to enhance the appearance of the frozen fish and reduce storage space.

It is another object of this invention to provide an improved fish storing rack and dividers for enhancing the freezing and storing of fish.

It is still another object of this invention to provide a modular divider for separating a storage rack for individually freezing fresh fish.

In relation to the method of this invention, the objects are best obtained by stacking one or more fish on the lengthwise edge of the fish, preferably belly-up in a tray between an expandable set of dividers; expanding the dividers to fill as much of the tray as is desired, with the dividers holding the fish upright in the tray and separating the fish from each other; freezing the fish in their separated, upright condition and storing the fish so frozen; and removing the fish while maintaining lack of contact between the fish so that the fish are individually and separately frozen, stored and separated for subsequent delivery to the ultimate user.

Basically, the apparatus of this invention is a combination tray and modular set of dividers. Preferably, the dividers are completely separable from one another, with attachment means for interconnecting alternating ends of adjacent dividers. The dividers are preferably expandable, like an accordion, to fit the desired amount of space of the tray. In an alternative embodiment, the dividers can be integrally attached, as by welding, so that the dividers are always interconnected. In the alternative embodiment, a preselected number of dividers would be integrally connected to provide sufficient expansion for the most commonly used sets of trays. A combination of separable dividers could be combined with a pre-integrally connected set of welded dividers so that a modular set of welded dividers could be provided with expansion to fit a larger tray or handle more fish by the addition of the separable but connectable dividers.

The dividers, per se, are a type of flexible plastic strips. The strips, when assembled together in modular form, form a matrix which will carry considerable load, for example, additional trays of fish stored on top of the dividers. The plastic is sufficiently flexible so that it will conform to the shape of upright fish. The dividers can be separate but interconnectable or can be permanently spot-welded or otherwise secured together at the time of manufacture.

The method and apparatus provide unique advantages over known fish freezing and storing techniques. The fishermen can carry either a supply of dividers all separate but connectable or an inventory of prefastened dividers or an inventory mixture of both. While at sea, when the fish are being harvested, the fish can be cleaned and immediately placed into trays. The number of dividers used can be determined by the size of the fish and the number of fish that will be placed in a particular tray. If the dividers are preconnected, additional dividers can be added to fill out a tray.

The fish will be stored in an upright condition so that there is no sag or bend created by the weight of the head and tail bending downwardly. That is, the fish will be stiff enough in the upright condition to retain their shape during the freezing and storing process.

The fish can be individually removed from the tray leaving an empty compartment, thus making the tray and dividers an ideal long-term storage device.

Other advantages will be apparent to one of ordinary skill in the art.

BRIEF DESCRIPTION OF THE DRAWINGS

FIG. 1 is an isometric of a fish storing rack and dividers embodying the principle of the invention.

FIG. 2 is a preferred embodiment of the dividers employed in the invention of FIG. 1.

FIG. 3 is a second embodiment of the dividers shown in FIG. 2, with the dividers of FIG. 3 being integrally connected at the time of manufacture but also with manual attachment means.

FIG. 4 is an isometric fragmentary detail showing a manual attachment means.

FIG. 5 is another embodiment of welded dividers with no manual attachment means.

BEST MODE FOR CARRYING OUT THE INVENTION

As best shown in FIG. 1, a fish tray 10 is formed of a sanitary, reusable-type plastic material of any well-known conventional construction. Placed within the tray are dividers 12 formed of plastic strips 14 and 16. In the alternative, all plastic strips can be in the form of either strip 14 or strip 16. Each strip 14 includes a tab end 14a having a plurality of circular tabs 18. A typical tab has a center 18a which is integral with the strip end 14a, a semicircular tab body 18b which can flex out of the plane of the tab end 14a, and a pair of prongs 18c which are cut so that when the tab is inserted through the mating slot 20 of the receiving end 14b of a strip, the prongs will protrude out beyond the slit, holding the tab securely to the opposite strip. Other connectors may also be employed, the object being to allow the tab end of one strip to be connected to the receiving end of the adjacent strip in one or more adjustable positions along the length of the strips.

In the embodiment shown where the strips are separable but connectable, the fishermen would carry a large number of individual strips in inventory. The strips would then be connected along their respective lengths and a desired number interconnected to fill the tray, depending on the size and quantity of fish.

The dividers could also be pre-manufactured, such as by welding two strips 16 together by heat or acoustic welds 30. If desired, the entire tray could be filled with integrally welded strips, with the understanding that the strips as interconnected could be expanded in an accordion action to fill all or part of the tray. FIG. 2 shows two strips 16, for example. FIG. 2 also shows a combination of two strips 16 interconnected by a heat weld, but with additional strips 14 being connected by tabs 18 to the innermost heat-welded strip 16 to expand even further the prewelded set of dividers. In still another technique, the heat-welded strip need not be interconnected by a tab and slit arrangement to the divider 14, but rather lie as a separate, completely independent set of pre-welded strips. The strips 16 in FIG. 5 are an example of strips without tabs or slots. The last strip 16 to the left in the tray shown in FIG. 1 is also a strip without tabs or slits. The strips 16 in FIG. 3 are welded, but in addition, have tabs and slots. The drawings are intended to illustrate all of these various configurations for the purpose of clarity and brevity.

Strips made of polyethylene or other plastic having characteristics of being able to withstand temperatures of −40° F. to −60° F. are preferred. The strips should be stiff enough to stand upright and preferably when connected together be strong enough to carry the weight of one or more loaded trays stacked on top of the strips.

While the preferred embodiment of the invention has been illustrated and described, it should be recognized that variations will be apparent to one of ordinary skill in the art. Accordingly, the invention is not to be limited to the specific embodiment illustrated in the drawings.

I claim:

1. A fish storing rack and dividers, comprising:
   a tray member having side walls and end walls and a bottom surface;
   a plurality of elongated, flexible divider strips positioned in said tray member upright along their longitudinal edge, said divider strips interconnected adjacent alternating opposite ends to form alternating converging compartments and opposite open ends, said converging compartments facing in alternating opposite directions, each having a common strip therebetween,
   said strips interconnected by means interconnecting said divider strips to normally compress said divider strips into engagement with one another such that the compartments formed when the divider strips are forced apart will snugly conform to the sides and tail of the smallest fish being stored.

2. The rack and dividers of claim 1, said strips being spaced by fish nested in said converging compartments.

3. The rack and dividers of claim 1, said strips being separable and said means for interconnecting the divider strips including connectors for joining the strips.

4. The rack and dividers of claim 3, said connectors including a tab extending laterally from a tab end of a strip and having slits for receiving a tab from an adjacent strip at an opposite receiving end.

5. The rack and dividers of claim 1, said strips being integrally bonded together and not separable, said strips being expandable into an accordion-like matrix.

6. The rack and dividers of claim 1 wherein the dividers extend upwardly above the side walls of the tray.

7. The rack and dividers of claim 1, wherein the divider strips each have sides and opposite ends, the means interconnecting the divider strips connecting the strips along their sides adjacent their ends but spaced inwardly from the ends at a point of tangency between strips to snugly seat the tail and sides of a fish between the strips.

8. The method of freezing and storing fish, comprising:
   connecting a first upright elongated flexible plastic strip at one end to a second upright elongated flexible plastic strip, separating the opposite unconnected ends of the two strips to form a fish-receiving compartment whose walls converge toward the connected end;
   connecting the opposite ends of the second strip to the first end of a third elongated flexible plastic strip lying on the opposite side of the second strip away from said fish-receiving compartment to form a second fish receiving compartment having side walls converging toward said connections between said second and third strips and with the converging ends of the first and second-fish-receiving openings alternately facing in opposite directions;
   connecting additional elongated flexible plastic strips in the same manner as above to form a matrix of alternatively facing fish-receiving compartments, said connecting steps interconnecting said strips to normally compress said strips into engagement with one another such that the compartments formed when the strips are forced apart will snugly conform to the sides and tail of the smallest fish being stored;
   placing the interconnected strips within a tray upright along their longitudinal edges;
   placing fish within the fish-receiving openings, with the fish lying on a lengthwise edge and supported by the strips; and
   freezing the fish in the tray.

9. The method of claim 8 wherein the fish have their tails positioned in the converging ends of the fish-receiving compartments so that the fish alternately face in opposite directions in the matrix.

10. The method of claim 8 wherein the strips are interconnected by welding.

11. The method of claim 8 wherein the strips are interconnected by inserting a locking tab from one strip into a slit in the adjacent interconnected strip.

12. The method of claim 8 wherein the strips are stored unconnected and are not connected until the strips are on a fishing boat where the fish are being frozen.

* * * * *